United States Patent [19]
Niederman

[11] Patent Number: 5,496,057
[45] Date of Patent: Mar. 5, 1996

[54] AIR BAG MODULE COVER RETAINER

[75] Inventor: Robert R. Niederman, Dayton, Ohio

[73] Assignee: General Motors Corporation, Detroit, Mich.

[21] Appl. No.: 415,017

[22] Filed: Mar. 31, 1995

[51] Int. Cl.⁶ .................................................. B60R 21/16
[52] U.S. Cl. ...................... 280/728.2; 280/731; 403/319
[58] Field of Search ............................ 280/728.1, 728.2, 280/728.3, 731, 732, 741; 403/318, 319, 315, 317, 154, 155

[56] References Cited

U.S. PATENT DOCUMENTS

| | | | |
|---|---|---|---|
| 4,877,264 | 10/1989 | Cuevas | 280/731 |
| 4,989,897 | 2/1991 | Takada | 280/728.3 |
| 5,141,247 | 8/1992 | Barth | 280/728.2 |
| 5,167,427 | 12/1992 | Baba | 280/728.3 |
| 5,186,492 | 2/1993 | Wright et al. | 280/728.2 |
| 5,201,541 | 4/1993 | Jones et al. | 280/731 |
| 5,280,946 | 1/1994 | Adams et al. | 280/728.2 |
| 5,312,129 | 5/1994 | Ogawa | 280/728.2 |
| 5,320,379 | 6/1994 | Burnard et al. | 280/728.2 |
| 5,354,093 | 10/1994 | Schenck et al. | 280/728.2 |
| 5,366,239 | 11/1994 | Headley | 280/728.2 |
| 5,388,858 | 2/1995 | Cuevas | 280/728.2 |
| 5,409,256 | 4/1995 | Gordon et al. | 280/728.2 |
| 5,421,607 | 6/1995 | Gordon | 280/728.2 |
| 5,435,593 | 7/1995 | Hiramitsu et al. | 280/728.2 |

FOREIGN PATENT DOCUMENTS

| | | | |
|---|---|---|---|
| 131886 | 5/1993 | Japan | 280/728.3 |
| 2270882 | 3/1994 | United Kingdom | 280/728.2 |

*Primary Examiner*—Paul N. Dickson
*Attorney, Agent, or Firm*—Howard N. Conkey; Kathryn A. Marra

[57] ABSTRACT

An air bag module includes an air bag and an inflator for discharging gas to inflate the air bag. The module includes a cover having a plurality of hooks and a base plate including a plurality of apertures for capturing the hooks of the cover therein. To securely retain the cover to the base plate, a cover retainer being a discontinuous resilient ring is utilized. The retainer is radially deformable for snap-fitted engagement with the base plate directly adjacent the hooks of the cover such that the retainer traps the hooks between the base plate and the retainer to prevent removal of the hooks from the apertures of the base plate and to anchor the cover to the base plate during air bag inflation.

10 Claims, 2 Drawing Sheets

AIR BAG MODULE COVER RETAINER

This invention relates to an air bag module, and more particularly to a mechanism for attaching a module cover to a base plate of the module.

BACKGROUND OF THE INVENTION

It is well known in motor vehicles to provide an air bag module mounted to a vehicle steering wheel. A typical driver's side air bag module includes a generally circular inflator positioned partially within a bag opening of an air bag for discharging inflator gas to inflate the air bag upon sensing certain predetermined vehicle conditions. The inflator, cover, and air bag are each mounted to the base plate to form the air bag module.

The cover of the air bag module overlies the air bag, inflator and other module components to form an aesthetically pleasing cover which is durable for normal vehicle use. The cover commonly has tear lines or weakened portions that allow the cover to open during air bag inflation. It is known to connect the cover of the air bag module to the base plate of a driver's side module or the housing of a passenger's side module by a plurality of fasteners. The use of multiple fasteners increases assembly time.

The prior art has also suggested the use of mating overlapping tabs on the cover and base plate or housing. However, assembly is still difficult since the tabs on the plate or housing are rigid metal which must be bent into place. The suggestion has also been made to form tabs in the cover which are trapped between the base plate and an additional relatively heavy plate-like structure needed to hold the cover in place during air bag inflation.

Many of the prior art covers have the significant disadvantage of being difficult to disassemble from the module, thus limiting access beneath the cover for serviceability of components, such as a horn switch. In addition, the module cover and fasteners in the prior art are likely to be damaged during disassembly of the cover from the module.

SUMMARY OF THE INVENTION

This invention provides an improved mechanism for attaching a cover to a base plate of an air bag module which is lightweight, which allows for facile attachment of the cover to the base plate without the use of fasteners, which allows for easy disassembly of the cover from the module without damage to the cover, and which anchors the cover to the module during air bag inflation.

In accordance with the present invention, an air bag module includes an air bag and an inflator for discharging gas to inflate the air bag. The module includes a cover having a plurality of hooks and a base plate including a plurality of apertures for capturing the hooks of the cover therein. To securely retain the cover to the base plate, a cover retainer being a discontinuous resilient ring is utilized. The retainer is radially deformable for snap-fitted engagement with the base plate directly adjacent the hooks of the cover such that the retainer traps the hooks between the base plate and the retainer to prevent removal of the hooks from the apertures of the base plate and to anchor the cover to the base plate during air bag inflation.

In a preferred form of the invention, the base plate includes a downwardly extending flange and the apertures are located on the flange. Also, the retainer preferably includes a plurality of radially projecting tabs which are matably aligned for engagement with the apertures in the base plate to secure the retainer to the flange and trap the hooks in the apertures between the base plate and the tabs.

It is also preferable to include a plurality of slits in the cover which form a plurality of flexible segments so that the cover is easily expandable to assist with assembly and disassembly of the cover from the module. Preferably, the hooks are located on alternating flexible segments.

Thus, the present invention provides an improved mounting mechanism in an air bag module which permits facile assembly of the cover to the base plate of the module, without the use of fasteners. In addition, assembly time is reduced since the cover is easily hooked onto the base plate after which the cover retainer is quickly snapped into place to prevent removal of the hooks. Thus, the cover is securely anchored to the base plate of the module during air bag inflation.

Advantageously, the present invention enables easy disassembly of the cover from the air bag module without damage to the cover to provide good serviceability.

The present invention is characterized by providing simplicity, ease of assembly and disassembly, and reduction of weight and parts in attachment of a cover to a base plate of an air bag module.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
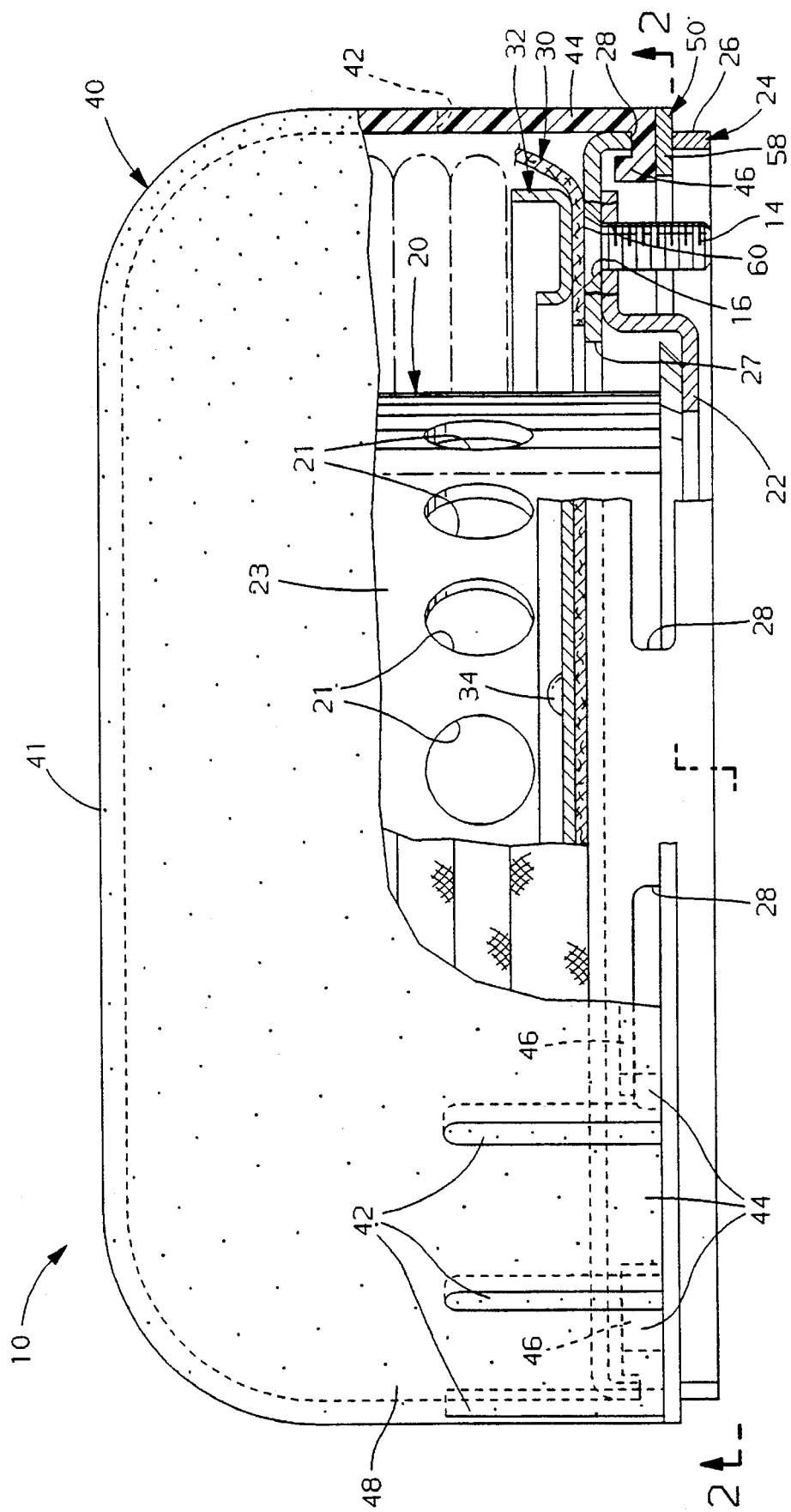
FIG. 1 is a side view of an assembled air bag module partially broken away to reveal the inflator, air bag, base plate and cover retainer.

Referring to FIG. 1, a driver's side air bag module is generally designated as 10. The component parts of the module 10 include a base plate 24, an air bag 30, a generally circular inflator 20, a cover 40 and a cover retainer 50. The air bag 30, the cover 40, and the inflator 20 are modularized with the base plate 24 to provide the air bag module 10, as will be further described in detail.

As best shown in FIG. 1, the air bag 30 may be of any conventional construction and material. The air bag 30 and air bag retainer 32 are secured to the base plate 24 by air bag fasteners 34, shown in FIG. 2. The air bag fasteners 34 secure the air bag 30 and air bag retainer 32 to the base plate 24 such that the base plate 24 may be temporarily mounted to a machine to fold the air bag 30 and such that the air bag 30 is anchored to the base plate 24 during air bag 30 inflation.

Figure 2:
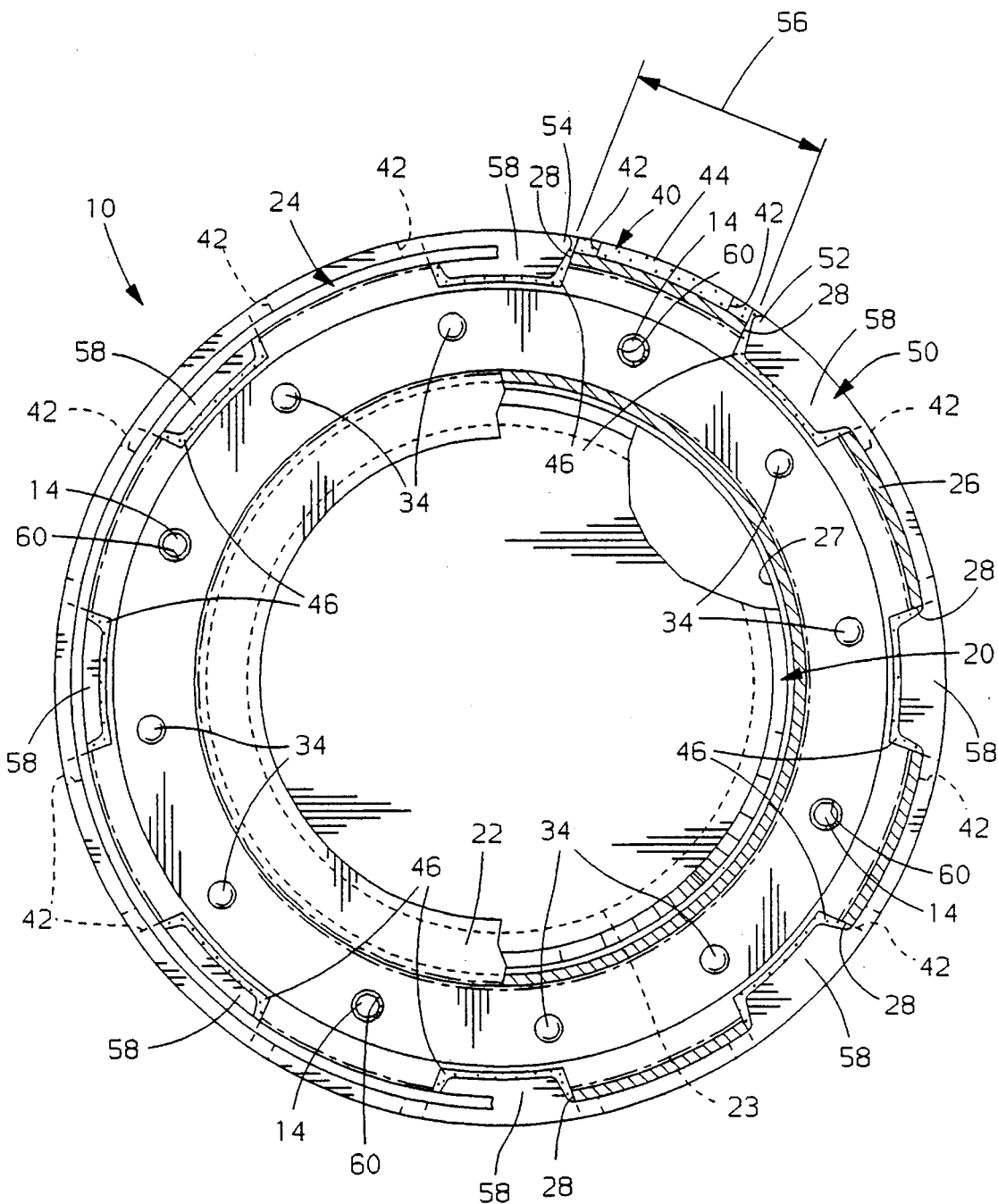
FIG. 2 is a cross-sectional view taken along line 2—2 of FIG. 1.

Referring to FIGS. 1 and 2, the base plate 24 is preferably circular and includes a centrally located circular plate opening 27 which has a diameter sized slightly larger than a main body 23 of the inflator 20. The base plate 24 includes a plurality mounting apertures 16 for mounting a plurality of elongate annular stud members 14 in a predetermined pattern, preferably being spaced evenly around the base plate 24. The stud members 14 extend through the base plate 24 and the inflator flange 22. As best shown in FIG. 1, the base plate 24 includes a downwardly extending base plate flange 26 which has a plurality of transversely elongated apertures 28 therethrough. The apertures 28 are preferably spaced evenly apart around the flange 26 of the base plate 24.

Referring to FIG. 1, the module 10 includes the inflator 20 for generating gas to inflate the air bag 30 when the inflator 20 receives a predetermined signal from a vehicle sensor, not shown. The inflator 20 has a generally circular shape and may be of a conventional construction for discharging gas such as through ports 21 in the main body 23 to inflate the air bag 30. The inflator 20 further includes a peripheral outwardly extending inflator flange 22 which may be integral with the inflator 20 or attached thereto such as by welding or fastening. The inflator flange 22 includes a plurality of flange openings 60 axially aligned for receiving the respective stud members 14 therethrough.

Referring to FIG. 1, the cover 40 includes a top portion 41 and a side portion 48 extending downwardly from the top portion 41. The cover 40 may be molded from a suitable polymeric or elastomeric material which is aesthetically pleasing to a vehicle occupant. The material should also be sufficiently durable for normal vehicle use, such as horn blowing, and sufficiently flexible and resilient to permit expansion of the cover 40 during module 10 assembly, as will be described further hereinafter.

The side portion 48 of the cover 40 preferably includes a plurality of vertical slits 42 which form a plurality of flexible segments 44. In a preferred form of the invention, alternating flexible segments 44 include radially inwardly projecting J-shaped integral hooks 46 spaced apart for alignment with the apertures 28 of the base plate flange 26, as will be described further hereinafter.

As best shown in FIG. 2, the cover retainer 50 is a discontinuous, generally circular ring which is constructed of a resilient material. The lightweight retainer 50 includes a first end 52 and a second end 54 which are circumferentially spaced apart to form a gap 56. The retainer 50 preferably includes radially inwardly projecting tabs 58 which are spaced apart on the retainer 50 for matable alignment with the apertures 28 on the base plate flange 26 and the hooks 46 on the cover 40. The retainer 50 is radially deformable, preferably being expandable by manual manipulation, for snap-fitted engagement with the apertures 28 of the base plate flange 26, as described below.

Referring to FIGS. 1 and 2, the module 10 is preferably assembled as follows. First, the air bag 30 and air bag retainer 32 are suitably secured to the base plate 24 by the use of air bag fasteners 34. Once the air bag 30 is in the folded condition, the cover 40 may be assembled to the base plate 24 as follows. First, the flexible segments 44 of the cover 40 are expanded radially outward either manually or by the use of a suitable radial expansion tool. With the flexible segments 44 stretched radially outward, the folded air bag 30 and base plate 24 may be dropped into the cover 40 such that the hooks 46 of the cover 40 are matably aligned with the apertures 28 in the base plate 24. The segments 44 of the cover 40 are then be released for inward radial movement and the hooks 46 of the segments 44 are pushed into the apertures 28 in the base plate flange 26 such that the hooks 46 extend through the apertures 28. It will be appreciated that the apertures 28 are sized slightly larger than the hooks 46 such that the hooks 46 are easily pushed into the apertures 28. Thus, the cover 40 is now attached to the base plate 24 by use of the hooks 46.

To securely anchor the cover 40 to the base plate 24, the cover retainer 50 is utilized. The resilient cover retainer 50 is radially expanded and placed around the flange 26 of the base plate 24. In addition, the tabs 58 of the retainer 50 are matably aligned with the apertures 28 of the base plate 24 such that the retainer 50 is located directly adjacent the hooks 46 of the cover 40. The retainer 50 is then released and permitted to resiliently contract radially inward such that retainer 50 engages the outer perimeter of the flange 26 of the base plate 24 and each of the tabs 58 of the retainer 50 are seated within each of the apertures 28 of the base plate 24. The tabs 58 prevent movement of the retainer 50 relative the base plate 24.

Next, the inflator is dropped into the module 10 with the main body 23 centered in the plate opening 27 of the base plate 24. The inflator flange 22 is suitably attached to the base plate 24 to complete the module. It is desirable to have the inflator 20 be the last component assembled to the module 10 for safety in handling. Finally, the entire module 10 is suitably mounted to a steering wheel (not shown), such as by use of the stud members 14.

In the assembled condition shown in FIGS. 1 and 2, the hooks 46 of the cover 40 and tabs 58 of the retainer 50 are sized such that the aperture 28 is closely filled. Thus, in the assembled condition the hooks 46 of the cover 40 are trapped in the apertures 28 between the retainer 50 and the base plate 24 whereby removal of the hooks 46 through the apertures 28 is prevented.

In the assembled condition, the retainer 50 securely anchors the cover 40 to the base plate 24 such that the cover 40 is held in position relative to the base plate 24 during the forces associated with air bag 30 inflation.

Upon actuation, the inflator 20 discharges inflator gas. The ports 21 of the inflator 20 direct the discharging inflator gas upwardly to inflate the air bag 30 which will deploy out through the cover 40 in a well known manner. For example, the cover 40 is preferably provided with weakened portions or tear lines which permit opening of the cover 40 during air bag 30 inflation. During the application of the forces associated with the discharge of inflator gas, the retainer 50 snap-fittedly engages the base plate flange 26 and remains securely mounted to the base plate 24 by the capture of the tabs 58 in the apertures 28 of the base plate 24. Also, the tabs 58 of the retainer 50 have a thickness which sufficiently fills the apertures 28 of the base plate 24 such that the hooks 46 of the cover 40 are trapped between the retainer 50 and the base plate 24 whereby removal of the hooks 46 out through the apertures 28 is prevented during air bag inflation.

Another advantageous aspect of this invention is the facile disassembly of the cover 40 which may be quickly accomplished without damage to the cover 40 or other components of the module 10. To disassemble the cover 40 from the module 10, the retainer 50 is radially outwardly expanded such that the tabs 58 are removed from the apertures 28 of the base plate flange 26 whereby the retainer 50 may be removed from the module 10. Next, the hooks 46 of the cover 40 are pulled out from the apertures 28 of the base plate flange 26 after which all of the flexible segments 44 may be outwardly radially expanded such that the entire cover 40 may be easily removed from the module 10 without damage.

It will be appreciated that the module 10 having the cover 40 having hooks 46 and the cover retainer 50 being a discontinuous resilient ring provides an improved mechanism permitting simple snap-together attachment of the cover 40 to the air bag module 10, without the use of fasteners, thus reducing assembly time. In addition, it will be appreciated that this arrangement also provides facile disassembly of the cover 40 from the air bag module 10 without incurring damage to any of the components of the module 10. Thus, the cover 40 may be removed from the module for serviceability of components, such as a horn switch contained in the module 10. As a further advantage, the cover 40 may easily be the final component added to the air bag module 10 during the assembly process, if so desired. Yet another advantage, is that the assembled cover 40 and cover retainer 50 permit access to the underside of the module 10 so that the inflator 20 may be the last component assembled. In addition, the cover 40 and cover retainer 50 permit access to the inflator 20 and stud members 14 of the module 10 for serviceability and for easy assembly and disassembly of the module 10 to the vehicle steering wheel.

It is also contemplated within the scope of this invention that the cover retainer 50 may be located on the inner side of the base plate flange 26 such that the tabs 58 of the retainer 50 project radially outward from the retainer 50 and out through the apertures 28 of the base plate 24. In such a case, during assembly the retainer 50 would be radially contracted for insertion within the flange 26 of the base plate 24. It will also be appreciated that any supportive structure in the module may serve as the base plate and is not limited to the example shown in this embodiment. For example, the inflator flange may also serve as the base plate such that the cover is hooked directly onto the inflator flange, if desired.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. An air bag module including an air bag and an inflator for discharging gas to inflate the air bag, the air bag module comprising:

a brace plate, a cover for covering the air bag and inflator, the cover including a plurality of hook means for connecting the cover to the base plate;

the base plate including a plurality of apertures for capturing the hook means of the cover therein; and a cover retainer being a discontinuous resilient ring, the retainer being radially deformable for snap-fitted engagement with the apertures of the base plate directly adjacent the hook means of the cover such that the retainer traps the hook means between the base plate and the retainer and prevents removal of the hook means from the apertures of the base plate to anchor the cover to the base plate and hold the cover in position relative to the base plate during air bag inflation.

2. The air bag module of claim 1 wherein the base plate includes a downwardly extending flange and the apertures are located on the flange of the base plate.

3. The air bag module of claim 1 wherein the cover has a plurality of slits forming a plurality of flexible segments and wherein the hook means is located on at least one of the flexible segments.

4. The air bag module of claim 3 wherein the hook means are located on alternating segments.

5. The air bag module of claim 1 wherein the hook means is J-shaped and integrally formed with the cover.

6. The air bag module of claim 1 wherein the retainer includes a plurality of radially projecting tabs which are spaced apart around the retainer for matable alignment with the apertures of the base plate and wherein the tabs of the retainer snap-fittedly engage the apertures of the base plate and trap the hook means of the cover in the apertures between the base plate and the tabs such that removal of the hook means is prevented during air bag inflation.

7. An air bag module including an air bag and an inflator for discharging gas to inflate the air bag, the air bag module comprising:

a base plate, a cover for covering the air bag and inflator, the cover having a plurality of hook means for connecting the cover to the base plate;

the base plate including a downwardly extending flange including a plurality of apertures for capturing the hook means of the cover therein; and a cover retainer being a discontinuous resilient ring having a plurality of radially projecting tabs, the retainer being radially deformable for positioning the tabs of the retainer in alignment with the apertures of the base plate directly adjacent the hook means, the retainer being releasable to snap-fittedly engage the tabs within the apertures of the base plate such that the hook means are trapped in the apertures between the tabs and the base plate such that the cover is anchored to the base plate and held in position relative thereto during air bag inflation.

8. The air bag module of claim 7 wherein the cover includes a plurality of vertically extending slits forming a plurality of flexible segments such that the cover is expandable and wherein the hook means of the cover are located on at least one of the flexible segments.

9. The air bag module of claim 8 wherein the hook means are located on alternating flexible segments.

10. An air bag module comprising:

a base plate having a downwardly extending flange having a plurality of apertures therein;

a cover having a plurality of slits forming a plurality of flexible segments, a plurality of the flexible segments having hook means for engaging and extending through respective apertures in the base plate; and a cover retainer being a discontinuous resilient ring for snap-fitted engagement with the flange of the base plate, the retainer having a plurality of radially projecting tabs aligned with and captured in respective apertures of the base plate adjacent the hook means of the cover such that the hook means are trapped in the apertures between the base plate and the tabs of the retainer whereby the cover is anchored to the base plate and held in position relative to the base plate during air bag inflation.

* * * * *